United States Patent

Kaufman et al.

[15] 3,640,070
[45] Feb. 8, 1972

[54] HYBRID PROPELLANT SYSTEM

[72] Inventors: Martin H. Kaufman; John D. O'Drobinak; James O. Dake, Jr., all of China Lake, Calif.

[73] Assignee: The United States of America as represented by the Secretary of the Navy

[22] Filed: Oct. 28, 1964

[21] Appl. No.: 407,262

[52] U.S. Cl. ................................60/220, 60/219, 149/19, 149/20, 149/36
[51] Int. Cl. ...........................................C06d 5/10
[58] Field of Search ...............60/35.4, 219, 220; 149/2, 1, 149/19, 20

[56] References Cited

UNITED STATES PATENTS

| | | | |
|---|---|---|---|
| 3,083,527 | 4/1963 | Fox | 60/35.4 |
| 3,235,421 | 2/1966 | Berenbaum et al. | 149/19 |
| 3,235,422 | 2/1966 | Stang | 149/19 |
| 3,255,059 | 6/1966 | Hamermesh et al. | 149/19 |

Primary Examiner—Benjamin R. Padgett
Attorney—G. J. Rubens, R. Miller and V. C. Miller

EXEMPLARY CLAIM

1. The method for creating propulsive thrust by burning a solid phase with a liquid phase injectant and exhausting the products from a rocket nozzle; said solid phase comprising from 17 to 22 percent by weight of a fluorocarbon binder selected from the group consisting of 1H, 1H, 9H-Hexadecafluoro-1-nonanomethacrylate, 1H, 1H, 7H-Dodecafluoro-1-heptanoacrylate, 1H, 1H, 5H-Octafluoro-1-pentanoacrylate and mixtures thereof; a plasticizer selected from the group consisting of triethylene glycol dinitrate, pentaerythritol trinitrate, trimethylol ethane trinitrate, butanediol dinitrate, a copolymer of vinylidene fluoride and perfluoropropylene, bis(2-fluoro-2,2-dinitroethyl)formal and mixtures thereof; and a free radical catalyst selected from the group consisting of azo-bisisobutyronitrile, benzoyl peroxide, dichlorobenzoyl peroxide, and methylethylketone peroxide; from 10–22 percent by weight of a metal fuel being a member selected from the group consisting of aluminum, beryllium, zirconium, thorium, uranium, boron, and mixtures thereof; and from 43 to 55 percent by weight of an oxidizer comprising a member selected from the group consisting of ammonium perchlorate, sodium perchlorate, potassium perchlorate, sodium nitrate, potassium nitrate, and barium nitrate;

said liquid phase injectant comprising from 4 to 12 percent by weight of a member selected from the group consisting of hydrazine, monomethylhydrazine, unsymmetrical dimethylhydrazine, perchlorofluoride, tetrafluorohydrazine, hydrogen peroxide, nitric acid, tetranitromethane, tri(difluoroamine)fluoroethane, and mixtures thereof.

5 Claims, No Drawings

HYBRID PROPELLANT SYSTEM

The invention herein described may be manufactured and used by or for the Government of the United States of America for governmental purposes without the payment of any royalties thereon or therefor.

The present invention relates to a new high impulse, high density hybrid propellant system.

Solid propellant rocket motors have been used for many years but have not been considered competitive to liquid propellant rocket motors because the specific impulse of solid propellant rocket motors is generally considered lower than the specific impulse of liquid propellant rocket motors. The specific impulse, or thrust per unit weight of propellant, is proportional to the square root of the temperature of the combustion products and is inversely proportional to the square root of the average molecular weight of exhaust products. For obvious reasons it is desirable to provide rockets with a specific impulse as high as possible. Work on the castable fluorocarbon composite propellants (disclosed in U.S. Pat. application, Ser. No. 394,379, filed Aug. 28, 1964) has shown that these propellants have high density-impulse. These propellants are very useful for boost applications and in volume limited situations. One of the problems faced by experts in the development of a hybrid propellant system has been the weight limitation. The present invention, by combining a composite fluorocarbon propellant with a liquid propellant, takes advantage of the high density of the composite propellant and the high impulse of the liquid propellant and thereby provides an improved hybrid propellant system.

It is therefore an object of this invention to provide a propellant system for use in a missile designed to have high boost velocity during the early part of flight.

Another object is to provide a propellant which has high specific impulse for use in a missile system which needs high thrust during the late stages of flight when it is at high altitude.

Yet another object is to produce a propellant which will contribute toward an improved hybrid rocket motor system.

A further object is to produce a propellant which possesses good safety characteristics.

Other objects, features, and many of the attendant advantages of this invention will become readily appreciated as the same become better understood by reference to the following detailed description.

The hybrid propellant formulation of the present invention comprises a solid phase and a liquid or injectant phase. The solid phase is a composite fluorocarbon propellant consisting essentially of a fluorocarbon binder, a metal fuel and an inorganic oxidizer. The liquid phase consists essentially of hydrazine, hydrazine derivatives and other suitable liquid high energy fuel. The following examples are illustrative of the practice of this invention but should not be construed as defining the limits thereof.

EXAMPLE I

| Ingredients | Percent by weight |
| --- | --- |
| Solid phase | |
| Fluorocarbon binder | 20.9 |
| Aluminum | 20.9 |
| Ammonium perchlorate | 53.4 |
| Liquid phase | |
| Hydrazine | 1.0 |
| Triamino-guanidine | 3.8 |

The fluorocarbon binder used above was prepared from the following constituents:

| | |
| --- | --- |
| 1H, 1H, 9H-Hexadeca Fluoro 1-nonanomethyacrylate | 66% |
| 1H, 1H, 5H-Octafluoro-1-pentanoacrylate | 21.85% |
| Copolymer of vinylidene fluoride and perfluoropropylene | 12.0% |
| Benzoyl peroxide | 0.15% |

The calculated specific impulse of this propellant was 258 seconds with a density of 2.0 g./cm.$^3$. Test data obtained on the firing of a 4½ inch motor showed a delivered impulse of 255 seconds with a density of 1.91 g./cm.$^3$. The chamber temperature was 6,225° F.

EXAMPLE II

| Ingredients | Percent by weight |
| --- | --- |
| Solid phase | |
| fluorocarbon binder | 19.1 |
| Aluminum | 17.4 |
| Ammonium perchlorate | 50.5 |
| Liquid phase | |
| Hydrazine | 2.6 |
| Triaminoguanidine | 10.4 |

The binder constituents used above were the same as those used in Example I.

The calculated specific impulse obtained for this formulation was 262 seconds with a density of 1.92 g./cm.$^3$. The chamber temperature was 5,770° F.

EXAMPLE III

| Ingredients | Percent by weight |
| --- | --- |
| Solid phase | |
| Fluorocarbon binder | 17.4 |
| Aluminum | 19.1 |
| Ammonium perchlorate | 50.5 |
| Liquid phase | |
| Hydrazine | 2.6 |
| Triaminoguanidine | 10.4 |

The binder used above is the same formulation as that described in Example I.

The calculated specific impulse obtained for the above composition was 263 seconds with a density of 1.93 g./cm.$^3$. The test chamber temperature was 5,894° F.

EXAMPLE IV

| Ingredients | Percent by weight |
| --- | --- |
| Solid phase | |
| Fluorocarbon binder | 21.7 |
| Beryllium | 10.9 |
| Ammonium perchlorate | 54.4 |
| Liquid phase | |
| Hydrazine | 2.6 |
| Triaminoguanidine | 10.4 |

The fluorocarbon binder used herein is the same as that described in Example I.

The calculated specific impulse of the above formulation was 280 seconds with a density of 1.82 g./cm.$^3$. The test chamber temperature was 6,011° F.

EXAMPLE V

| Ingredients | Percent by weight |
| --- | --- |
| Solid phase | |
| Fluorocarbon binder | 21.7 |
| Zirconium | 21.8 |
| Ammonium perchlorate | 43.5 |

| Liquid phase | |
|---|---|
| Hydrazine | 2.6 |
| Triaminoguanidine | 10.4 |

The fluorocarbon binder above consisted essentially of the same constituents disclosed in Example I.

The calculated specific impulse for the above formulation was 234 seconds with a density of 2.13 g./cm.$^3$. The test chamber temperature was 5,135° F.

The injectant used in the liquid phase in the examples herein consisted of hydrazine in which triaminoguanidine was dissolved and suspended which increases its density and total energy. Other suitable liquid injectants include monomethylhydrazine, unsymmetrical dimethylhydrazine, perchlorofluoride, tetrafluorohydrazine, hydrogen peroxide, nitric acid, tetranitromethane, tri(difluoroamine)fluoromethane and mixtures thereof.

The binder composition which is one component of the solid phase generally comprises the following ingredients: fluorocarbon monomer selected from the group consisting of 1H, 1H, 9H-Hexadecafluoro-1-nonanomethyacrylate, 1H, 1H, 7H-Dodecafluoro-1-heptanoacrylate, 1H, 1H, 5H-Octafluoro1-pentanoacrylate and mixtures thereof; a plasticizer selected from the group consisting of triethylene glycol dinitrate, pentaerythritol trinitrate, trimethylol ethane trinitrate, butanediol dinitrate, a copolymer of vinylidene fluoride and perfluoropropylene (Viton), bis(2-fluoro-2,2-dinitroethyl)formal, a fluorinated polyester and mixtures thereof; and a free radical catalyst selected from the group consisting of azo-bisisobutyronitrile, benzoyl peroxide, dichlorobenzoyl peroxide, and methyethylketone peroxide.

Vinyl monomers selected from the group consisting of acrylic acid, acrylonitrile, vinylacetate, dinitropropylacrylate and styrene have also been admixed with the fluorocarbon monomers to vary the viscosity of the binder composition.

The metal fuel used in the solid phase was generally aluminum. However, beryllium and zirconium proved quite successful in increasing the specific impulse and the density. Thorium, uranium and other heavy metals will provide increased densities alone or in mixtures with beryllium, boron, aluminum or zirconium.

Likewise other oxidizers have been used such as sodium or potassium perchlorate and sodium, potassium or barium nitrates.

Thus by utilizing the cast fluorocarbon composite propellant with liquid fuel injectant in a hybrid propellant motor improved performance was obtained by means of an impulse gain with a small decrease in density. These hybrid propellants are especially useful in boost and volume limited applications. The present hybrid propellant has a correspondingly lower flame temperature in comparison to the composite fluorocarbon propellant used in solid rocket motors.

By increasing or decreasing the liquid to solid ratio of the hybrid propellant it is possible to either increase or decrease the system impulse with a corresponding change in density.

Obviously many modifications and variations of the present invention are possible in the light of the above teachings. It is therefore to be understood that within the scope of the claims the invention may be practiced otherwise than as specifically described.

What is claimed is:

1. The method for creating propulsive thrust by burning a solid phase with a liquid phase injectant and exhausting the products from a rocket nozzle; said solid phase comprising from 17 to 22 percent by weight of a fluorocarbon binder selected from the group consisting of 1H, 1H, 9H-Hexadecafluoro-1-nonanomethacrylate, 1H, 1H, 7H-Dodecafluoro-1-heptanoacrylate, 1H, 1H, 5H-Octafluoro-1-pentanoacrylate and mixtures thereof; a plasticizer selected from the group consisting of triethylene glycol dinitrate, pentaerythritol trinitrate, trimethylol ethane trinitrate, butanediol dinitrate, a copolymer of vinylidene fluoride and perfluoropropylene, bis(2-fluoro-2,2-dinitroethyl)formal and mixtures thereof; and a free radical catalyst selected from the group consisting of azo-bisisobutyronitrile, benzoyl peroxide, dichlorobenzoyl peroxide, and methylethylketone peroxide; from 10-22 percent by weight of a metal fuel being a member selected from the group consisting of aluminum, beryllium, zirconium, thorium, uranium, boron, and mixtures thereof; and from 43 to 55 percent by weight of an oxidizer comprising a member selected from the group consisting of ammonium perchlorate, sodium perchlorate, potassium perchlorate, sodium nitrate, potassium nitrate, and barium nitrate;

said liquid phase injectant comprising from 4 to 12 percent by weight of a member selected from the group consisting of hydrazine, monomethylhydrazine, unsymmetrical dimethylhydrazine, perchlorofluoride, tetrafluorohydrazine, hydrogen peroxide, nitric acid, tetranitromethane, tri(difluroamine)fluoroethane, and mixtures thereof.

2. The method of claim 1 wherein the solid phase comprises the following constituents:

| Fluorocarbon binder | 19–21% by weight |
|---|---|
| Aluminum | 17–21% by weight |
| Ammonium perchlorate | 50–54% by weight | said binder consisting of 66 percent 1H, 1H, 9H-Hexadecafluoro-1-nonanomethacrylate, 21.85 percent 1H, 1H, 5H-Octafluoro-1-pentanoacrylate, 12.0 percent of the copolymer of vinylidene fluoride and perfluoropropylene and 0.15 percent benzoyl peroxide; and the injectant consists essentially of from 1 to 3 percent by weight hydrazine and from 3 to 11 percent by weight triaminoguanidine.

3. The method of claim 1 wherein the solid phase consists essentially of the following constituents:

| Fluorocarbon binder | 21.7% by weight |
|---|---|
| Beryllium | 10.9% by weight |
| Ammonium perchlorate | 54.4% by weight | said binder consisting essentially of 66 percent 1H, 1H, 9H-Hexadecafluoro-1-nonanomethacrylate, 21.85 percent 1H, 1H, 5H-Octafluoro-1-pentanoacrylate, 12.0 percent of the copolymer of vinylidene fluoride and perfluoropropylene, and 0.15 percent benzoyl peroxide; and the injectant consisting of about 2.6 percent by weight hydrazine and about 10.4 percent by weight triaminoguanidine.

4. The method of claim 1 wherein the solid phase consists essentially of the following constituents:

| Fluorocarbon binder | 21.7% by weight |
|---|---|
| Zirconium | 21.8% by weight |
| Ammonium perchlorate | 43.5% by weight | said binder consisting essentially of 1H, 1H, 9H-Hexadecafluoro-1-nonanomethacrylate, 1H, 1H, 5H-Octafluoro-1-pentanoacrylate, the copolymer of vinylidene fluoride and perfluoropropylene, and benzoyl peroxide; and the injectant phase consists of about 2.6 percent by weight hydrazine and about 10.4 percent by weight triaminoguanidine.

5. The method for creating propulsion thrust by burning a solid fluorocarbon propellant composition with hydrazine and exhausting the products from a rocket nozzle; said composition comprising a binder consisting essentially of 1H, 1H, 9H-Hexadecafluoro-1-nonanomethacrylate, 1H, 1H, 5H-Octafluoro-1-pentanoacrylate; the copolymer of vinylidene fluoride and perfluoropropylene, and benzoyl peroxide; a metal fuel selected from the group consisting of aluminum, zirconium and beryllium, and an oxidizer selected from the group consisting of ammonium perchlorate, sodium perchlorate, potassium perchlorate, sodium nitrate, potassium nitrate and barium nitrate.